US012605866B2

(12) United States Patent
Vermeulen et al.

(10) Patent No.: US 12,605,866 B2
(45) Date of Patent: Apr. 21, 2026

(54) PRESS ELEMENT AND METHOD FOR MANUFACTURING PRESS ELEMENTS

(71) Applicant: Flooring Industries Limited, SARL, Bertrange (LU)

(72) Inventors: Bruno Vermeulen, Wielsbeke (BE); Laurent Meersseman, Mont de l'Enclus (BE); Hans De Cock, Herzele (BE)

(73) Assignee: UNILIN, BV, Wielsbeke (BE)

( * ) Notice: Subject to any disclaimer, the term of this patent is extended or adjusted under 35 U.S.C. 154(b) by 248 days.

(21) Appl. No.: 18/060,336

(22) Filed: Nov. 30, 2022

(65) Prior Publication Data

US 2023/0173715 A1     Jun. 8, 2023

Related U.S. Application Data

(60) Provisional application No. 63/285,296, filed on Dec. 2, 2021.

(30) Foreign Application Priority Data

Jun. 10, 2022    (BE) .................................. 2022/5454

(51) Int. Cl.
    *B29C 33/38*        (2006.01)
    *B29C 33/42*        (2006.01)
    *B29C 59/02*        (2006.01)
(52) U.S. Cl.
    CPC ........ *B29C 33/3842* (2013.01); *B29C 33/424* (2013.01); *B29C 59/022* (2013.01); *B29C 59/026* (2013.01); *B29C 2059/023* (2013.01)

(58) Field of Classification Search
    CPC . B29C 33/3842; B29C 33/424; B29C 59/022; B29C 59/026; B29C 2059/023; B30B 3/005; B30B 15/062; B32B 37/10; B32B 3/30; B32B 21/02; B32B 21/06; B32B 21/08; B44B 5/026; B44C 5/04; B44C 1/221; B44C 1/222; B44C 1/227; B44C 1/24
    USPC .......................................................... 216/49
    See application file for complete search history.

(56) References Cited

U.S. PATENT DOCUMENTS

| | | | | |
|---|---|---|---|---|
| 2004/0135293 A1* | 7/2004 | Umeki | ................ | B29C 35/0894 |
| | | | | 264/494 |
| 2010/0006542 A1* | 1/2010 | Reichert | ................. | B44B 5/026 |
| | | | | 216/48 |
| 2020/0255954 A1* | 8/2020 | Segaert | ................... | B44B 5/026 |
| 2021/0157042 A1* | 5/2021 | Rahomäki | .......... | G02B 27/0172 |

FOREIGN PATENT DOCUMENTS

| CA | 2865973 A1 | 11/2013 |
|---|---|---|
| CN | 105835589 A | 8/2016 |
| EP | 1669193 A1 | 6/2006 |
| EP | 1987395 A1 | 11/2008 |
| EP | 2123476 A2 | 11/2009 |
| EP | 2251193 A1 | 11/2010 |

(Continued)

*Primary Examiner* — Duy Vu N Deo

(74) *Attorney, Agent, or Firm* — Workman Nydegger

(57) ABSTRACT

A Press element and a method for manufacturing a structured press element, wherein a heterogeneous mask is applied on a metallic base element, after which a surface treatment is carried out and the heterogeneous mask has a certain resistance to the surface treatment.

12 Claims, 4 Drawing Sheets

(56)          References Cited

FOREIGN PATENT DOCUMENTS

| EP | 2834076 | A2 | | 2/2015 |
|----|---------|-----|---|--------|
| JP | H0632100 | A | | 2/1994 |
| JP | H0754166 | A | | 2/1995 |
| JP | 3274912 | B2 | * | 4/2002 |
| WO | 0196689 | A1 | | 12/2001 |
| WO | 2006066776 | A2 | | 6/2006 |
| WO | 2014115086 | A2 | | 7/2014 |

* cited by examiner

PRESS ELEMENT AND METHOD FOR MANUFACTURING PRESS ELEMENTS

BACKGROUND

The present invention relates to press elements, methods for the manufacture of press elements, and coated panels obtained with press elements.

More particularly, the invention relates to the manufacture of press elements that are used in a method for manufacturing coated panels, wherein the coated panels are of the type that comprises a substrate and a decorative top layer applied thereon. These may be for example floor panels that consist mainly of a substrate and a top layer. The substrate may for example comprise an MDF or HDF (Medium Density Fiberboard or High-Density Fiberboard) panel or a particle board panel, on which a top layer, such as a laminated top layer comprising resin-impregnated layers of paper, is applied. The substrate may also comprise one or more thermoplastic-based layers, wherein a top layer, such as a laminated top layer comprising thermoplastic-based sublayers, is then applied. Other examples of possible substrates are, among others, mineral-based substrates, such as cement-based, MgO-based or gypsum-based substrates, or geopolymer-based substrates.

In particular, the invention relates to press elements that are used in a method for manufacturing coated panels with a printed decor with a transparent or translucent plastic layer extending above it. It is known that a decor of this kind, possibly provided that priming coats are applied, can be printed directly on the substrate. The decor may, however, also be provided on a sheet of material, such as a paper sheet or a plastic foil, which is incorporated in the aforementioned top layer. Optionally, a transparent or translucent plastic layer may form a protective layer above the printed decor and this transparent or translucent plastic layer may for example comprise wear-resistant particles such as aluminum oxide or corundum. It is not excluded that this protective layer also comprises a sheet of material, such as a paper sheet or plastic foil. It may for example relate to the manufacture of laminate floor panels, for example according to a DPL (Direct Pressure Laminate) or HPL (High Pressure Laminate) technique. In the case of a DPL technique, one or more sheets of material provided with resin together with the substrate are introduced into a press where on the basis of a press element and under the action of increased pressure and temperature, they are bonded both together and to the substrate. In the case of an HPL technique, the top layer is formed separately on the basis of two or more sheets of material provided with resin, before the resultant top layer is applied on the substrate, for example by gluing this to the substrate. According to another possibility, it may relate to the manufacture of plastic-based floor panels or floor coverings, for example such as vinyl panels, vinyl coverings and the like.

It is known, for example from WO 01/96689 or WO 2014/115086, that a relief of impressed portions can be formed on the surface or the decorative side of said coated panels, with which for example the natural structure of the pattern reproduced in the aforementioned decor can be imitated. Thus, for example in the case when the decor reproduces a wood pattern, a relief is used that imitates a wood structure. Said wood structure may optionally be coordinated with the underlying decor, so that then so-called depressions are obtained in register with the printed decor. To produce a relief on the decorative side, structured press elements are used, as is known. Various techniques are known for manufacturing said press elements, for example from WO 2006/066776, EP 2 123 476, EP 2 251 193, EP 1 987 395 and EP 2 834 076. From EP'395, a method is known for the manufacture of structured press elements, wherein the method comprises at least the following steps:

the step of providing an element made of metal;

the step of applying a mask on a surface of the element for masking portions of the aforementioned surface;

the step of chemical processing or etching of unmasked portions of the aforementioned surface of the element; and the step of removing the aforementioned mask.

The press elements that are obtained on the basis of the methods from the prior art still leave something to be desired, particularly when they are used for producing relatively deep structural portions in the surface of the press element in question, for example in the case of structural portions with a depth greater than 0.15 mm, or 0.3 mm or more.

To achieve a deep structure, several cycles of masking and etching may be applied. However, such a method has the result that projections have lateral edges with disturbingly visible boundaries, such as step-shaped/step-like abrupt changes in slope angle. These boundaries are copied in the surface of the coated or laminated panels manufactured therewith and distract from the generally fine imitation of a natural structure, for example such as a wood structure, or a structure that forms lowered edges, such as chamfered edges. Another drawback is also that several cycles are needed, in which a mask is always applied, etching is carried out, the mask is removed again. This is of course very time-consuming.

It may also be desirable to have subtle height differences in the press element, for example microstructures. This then relates for example to structures with height differences between for example 5 and 30 microns. Differences in gloss can be obtained with the aid of said microstructures. With existing surface treatments, it is difficult to apply these microstructures precisely and/or repetitively.

Thus, both for press elements with microstructures, and for press elements with deep structures, and for press elements with microstructures and deep structures, the existing methods for the manufacture of press elements leave something to be desired.

In existing methods for the manufacture of press elements, wherein use is made of etching, often additional processing steps are also carried out to optimize the structure of the press element even further. These additional processing steps may comprise one or more of the following processing operations: milling operations, laser treatment, sandblasting, polishing, etc. With these additional processing steps, the structure of the press element can be optimized further, but extra infrastructure is required for these additional processing steps.

SUMMARY

The present invention relates to alternative methods for manufacturing a press element, alternative press elements and alternative coated panels, which according to various preferred embodiments of the invention can offer advantages relative to the prior art.

According to a first aspect, the invention relates to a method for manufacturing a structured press element, wherein this method comprises at least the following steps:

providing a metallic base element, such as a plate or roller. This metallic base element comprises for example steel and/or copper and/or brass;

applying a mask on a surface of the metallic base element, wherein the mask has a certain resistance to a surface treatment so as to cover the surface at least temporarily from the surface treatment at the level of the mask;

carrying out the surface treatment;

wherein said mask has a heterogeneous build, and at least this build determines the extent of said resistance to the surface treatment.

A structured press element means a press element comprising an outer surface with a certain structure/relief.

The metallic base element may for example be a plate, wherein the press element is then for example a press plate. The surface of the metallic base element then extends substantially in one plane. The metallic base element may also be a roller, wherein the press element is then for example an embossing roller. The surface of the metallic base element is then preferably cylindrical. The metallic base element may for example be made substantially of steel and may possibly comprise an additional coating. This additional coating may comprise copper and/or nickel. After said surface treatment and optional removal of the mask, the surface formed may be finished with one or more layers comprising chromium, i.e., chromium layers. A chromium layer serves as protection against wear and mechanical damage. It also ensures that plates comprising resins detach readily from the press element after pressing. This chromium layer may comprise one or more types of chromium, depending on the desired gloss. This chromium layer may consist of one or more layers. Thus, for example, a chromium base layer may be applied over the whole surface, which provides a certain gloss, and then an additional chromium layer with a different gloss is applied at specific places.

Here, a surface treatment preferably means a material-removing surface treatment. Through removal of material, valleys are formed and therefore also hills, and a surface structure is thus formed. It is also possible that during the surface treatment, some dents and the like are applied in the surface, without removal of material. The surface treatment may also be a combination of removal of material and application of dents and the like. The surface treatment, as stated in the claims, may comprise one or more of the following treatments from the following non exhaustive list: an etching treatment, for example a chemical etching treatment with an etchant; a polishing treatment, for example a mechanical polishing treatment or an electropolishing treatment; a sandblasting treatment, a laser treatment, a milling treatment. The aforementioned treatments may each consist of one or more sub-steps. Here, an etching treatment preferably means a chemical etching treatment, wherein the surface is for example exposed to an etchant. For this, for example the base element can be introduced into an etch bath filled with an etchant, so that at least a portion of the surface is exposed to the etchant. Another possibility is to spray an etchant, once or several times, on the surface of the metallic base element, for example by moving the metallic base element under a bridge comprising spraying heads, wherein the spraying heads apply the etchant on the surface while the metallic base element travels under the bridge.

The surface treatment, as stated in the claims, may for example also relate to one type of surface treatment such as presented above, being for example an etching treatment or a polishing treatment or a laser treatment or a milling treatment. Other surface treatments are possible, but are then viewed for example as an additional surface treatment that takes place before, during or after the first said surface treatment. Thus, the surface treatment may be an etching treatment that consists of one or more sub-steps.

In this case, said mask has a heterogeneous build, so that the resistance to the surface treatment, for example the etching treatment and/or the sandblasting treatment and/or the polishing treatment and/or the laser treatment, is not identical everywhere. Certain parts of the mask, the less resistant parts, will therefore be more sensitive to the surface treatment than other parts, and so will break down/degrade more easily. Therefore, during the surface treatment, certain parts of the mask will degrade and even disappear completely. This means that portions of the surface that were covered by the mask first are no longer covered during the surface treatment, and so are also subjected to the surface treatment. During the surface treatment, the portions on which a mask was not applied are treated and so for these portions there will for example be removal of material. However, even portions that were originally covered by the mask, but the mask degrades/decomposes during the surface treatment, will also be treated during the surface treatment, so that for example removal of material will also occur here. For these last-mentioned portions, there will be less removal of material than for the first aforementioned portions, if the surface treatment is a material-removing surface treatment. The great advantage is that during one and the same surface treatment, components of the surface can be treated differently. Thus, the non-shielded portions are exposed to the complete surface treatment, certain originally shielded portions are exposed temporarily to the surface treatment starting from a certain time point of the surface treatment, depending on how quickly the mask on those places degrades, and for example certain portions of the shielded portions are not exposed to the surface treatment. Here, these press elements can be provided in a simple way with the desired structure without the need for example for several cycles of masking, etching and mask removal; and/or the need for the aforementioned additional treatment steps, for example milling or laser treatment, when the surface treatment for example comprises an etching treatment, or a polishing treatment or a sandblasting treatment; and/or the need for the application of several masks at one and the same place. Of course, in this method it is also possible to employ several cycles of masking and mask removal; and/or the aforementioned additional treatment steps. These optional additional treatment steps may take place before and/or during and/or after said surface treatment.

The mask may comprise one or more of the following, unless incompatible: a wax, (UV) inks, powder that is fixed on the surface by means of a laser treatment, thermoplastics, coatings, acrylates, thermosets, polystyrenes, epoxy compounds, a varnish. It is possible that the mask can be indicated with two or more names from the aforementioned list. Thus, the mask may be a coating comprising a thermoset or the mask may be a varnish comprising acrylates.

Owing to the invention, the desired press element can be obtained in a simple manner, for example by means of the one-time application of a mask and carrying out a surface treatment that only makes use of for example chemical etching. Preferably, a mask is applied only once, after which the metallic base element with the mask is submitted to the surface treatment, which is a material-removing surface treatment. More preferably, the surface treatment comprises only an etching treatment. This etching treatment may consist of one or more sub-steps. Additional surface treatments are not excluded.

Even more preferably, this method comprises, after execution of the surface treatment, an additional step of removing the mask. This means the step in which the still remaining portion of the mask is removed. This is because it is possible that the less resistant portions of the mask had already been removed partly or completely during the surface treatment. Moreover, more resistant portions may be removed partially by the surface treatment, for example may become thinner, but in the case of these more resistant portions, for example the surface covered by these more resistant portions still remains covered during the complete surface treatment. During removal of the mask, there may be a slight structural change of the surface, but this is not regarded here as a component of the material-removing surface treatment, since the main aim is only mask removal. For removal of the remaining mask, it is possible for example to make use of a cleaning and/or neutralizing agent. It is also possible to use an ultrasonic vibrator or the like. It is also possible to use laser ablation and/or milling and/or polishing. Combinations of several techniques are also possible. The great advantage in this method is that, during the surface treatment, a part of the mask is removed already, so that in the mask removal step, already less mask is present and there is thus less need for a cleaning and/or neutralizing agent and/or this step can be carried out in a shorter time. The mask removal step may also be regarded as a preferably last, sub-step of the surface treatment, wherein the resistance of the mask is then such that after the surface treatment the mask has disappeared completely. Preferably, the mask removal step is regarded as an additional step, in addition to the surface treatment, since in the mask removal step there is preferably no or hardly any change of the relief of the surface of the metallic base element.

It is also possible that the method does not comprise a step for removal of the mask, because the mask has for example already disappeared completely owing to the surface treatment (see above) or because it may perhaps be desirable that a part of the mask remains. The remaining portion of the mask will then also determine the surface structure of the press element.

In a preferred embodiment, the mask divides said surface of the metallic base element into one or more shielded portions, on which the mask is located, and one or more non-shielded portions, on which there is no mask or there is hardly any mask, for example only a base layer, and wherein the mask comprises one or more edge portions and one or more internal portions, wherein the one or more internal portions are each completely surrounded by one or more adjoining edge portions, and the one or more edge portions extend between one or more adjoining non-shielded portions of the surface, and one or more adjoining internal portions of the mask, wherein the method comprises one or more of the following features, provided these are not incompatible:

the build of the mask is such that at the level of at least one aforementioned edge portion, the resistance to the surface treatment increases, preferably increases gradually, from a respective adjoining non-shielded portion to a respective adjoining internal portion. During the surface treatment the edge portions here will be more affected, and they may even break down partially and/or completely, so that the parts of the surface that were underneath these edge portions at the beginning of the surface treatment become exposed during the surface treatment and these parts are thus also processed, but are processed less than the non-shielded portions. This makes it possible to obtain a structured press element with a relief with smooth transitions, with which aesthetic coated panels can be manufactured.

the build of the mask is such that at the level of at least one aforementioned edge portion, the thickness of the mask increases, preferably increases gradually, from a respective adjoining non-shielded portion to a respective adjoining internal portion. During the surface treatment, the thickness of the mask may for example decrease, possibly gradually. This means that thinner parts of the mask may even disappear completely during the surface treatment, so that at the level of these thinner portions the surface will also be processed by the surface treatment, but to a less extent than the non-shielded portions. This makes it possible to obtain a structured press element with a relief with smooth transitions, with which aesthetic coated panels can be manufactured.

the aforementioned one or more edge portions form lateral flanks of the mask, wherein these lateral flanks have a transition preferably with rounding into the one or more adjoining non-shielded portions. These flanks allow the edge portions to disappear gradually during the etching treatment, first at the level of the non-shielded portions and later toward the internal portions. This makes it possible to obtain a structured press element with a relief with smooth transitions, with which aesthetic coated panels can be manufactured.

the thickness of the mask is heterogeneous, so that the mask comprises thicker sections with a thickness above a certain threshold value and thinner sections with a thickness below this threshold value, wherein preferably the aforementioned edge portions at least form part of these thinner sections and wherein more preferably the thinner sections are directly adjacent to the one or more non-shielded portions. This threshold value for example corresponds to the maximum thickness of the mask that can be removed during the complete surface treatment. At the level of thicker sections, this means that even after the surface treatment, the respective surface is still covered, whereas for the thinner sections the mask has disappeared almost completely after the surface treatment. In the optional step of mask removal, the mask then only has to be removed at the level of the thicker sections.

the build of the mask is such that the resistance to the surface treatment at the level of at least one aforementioned internal portion is greater than the resistance to the surface treatment at the level of an aforementioned adjoining edge portion.

the thickness of the mask at the level of said one or more internal portions is always greater than the thickness at the level of one or more corresponding edge portions.

the chemical composition of an aforementioned edge portion differs from the chemical composition of a respective adjoining internal portion. Thus, owing to the difference in chemical composition, the edge portion may be less resistant than the internal portion, so that the edge portion will break down completely during the surface treatment. This makes it possible to obtain a structured press element with a relief with smooth transitions, with which aesthetic coated panels can be manufactured.

the mask is made from at least one curable substance, wherein the degree of cure at the level of an aforementioned edge portion is lower than the degree of cure at the level of a respective adjoining internal portion. At a lower degree of cure, the mask may be less resistant to the surface treatment, so that the less cured portions for example will break down completely during the surface treatment.

the aforementioned one or more edge portions all have an identical first chemical composition and the aforementioned one or more internal portions all have an identical second chemical composition, wherein the first chemical composition is less resistant to the surface treatment than the second chemical composition. For example, when the surface treatment is an etching treatment or comprises an etching treatment, the mask portions with the second chemical composition may be more resistant to an etchant used in the etching treatment, than the mask portions with the first chemical composition. Additionally, or as an alternative, the mask portions with the second chemical composition may for example be better attached to the surface than mask portions with the first chemical composition, so that these will break down/degrade less quickly.

the mask is made from at least one curable substance, wherein the degree of cure at the level of said one or more internal portions is greater than the degree of cure at the level of said one or more edge portions.

the mask is built up from two or more layers, namely at least one bonding layer and a second layer, wherein these layers are possibly built up from several sublayers, wherein the bonding layer reinforces the bond between the surface and the second layer, and wherein at the level of the edge portions, said bonding layer is absent. This bonding layer may for example provide greater resistance to the surface treatment.

prior to application of the mask, the surface may be submitted to an ultrasonic treatment. By means of the ultrasonic treatment, portions of the mask to be applied will for example adhere better to the surface. The ultrasonic treatment may then for example ensure very good adhesion between the surface and the internal portions, so that at the level of the internal portions, the surface remains covered during the complete surface treatment. Thus, the internal portions and edge portions may be made from different materials, wherein the material from which the edge portions are made, adheres less well to the surface than the material from which the internal portions are made.

marks are applied on the surface prior to application of the mask on the surface, wherein the mask is positioned and/or is built up heterogeneously on the basis of the marks. The positioning and/or heterogeneous built up may take place by means of one or more detection systems, such as cameras, which can detect these marks. The marks may for example indicate where and what thicknesses are desired, where and what curing is desired, where printing is required if the mask is printed, etc. The mask may for example consist of at least two materials, each with a different chemical composition, wherein the marks may then indicate what material must be applied on what. By means of marks, a heterogeneous mask can be applied accurately on the surface.

the mask may for example consist of at least two materials, each with a different chemical composition. Thus, the materials may for example be intended to harden under the influence of visible light or UV radiation, wherein one material, based on percentages by weight, comprises more photo initiators than the second material, so that the first material will cure more than the second material under the influence of visible light or UV radiation, so that the aforementioned embodiment can be obtained easily with different degrees of cure as described above.

the mask is made from at least one curable substance, the mask applied comprises marks and the mask is cured at least partially on the basis of the marks.

use is made of a grayscale printer, so that the thickness of the mask can vary depending on the place. Thus, this grayscale printer may for example comprise at least one printing fluid for printing the mask, wherein it is then possible, by means of the grayscale printer, to choose for each place of the surface, how many droplets of the printing fluid, for example between 0 and 7 drops or between 0 and 5 drops or between 0 and 10 drops, will be applied. All integers—1, 2, 3, 4, 5, 6, 7, 8, 9 and 10—in the aforementioned ranges are then possible for the number of drops. The drop size may for example be between 4 and 8 picoliters, for example may be 6 picoliters, so that, if there is the possibility of going up to 7 drops, one can vary between 0 times, once, twice, three times, four times, five times, six times and seven times the above drop size.

the mask is applied by applying a powder on the metallic base element, after which this powder is melted by means of a laser and is fixed to the surface. It is possible to choose on which places the powder can possibly be fixed on the surface and/or the degree of fixation may also be determined and/or the amount of powder that is spread on a certain place may also be selected. The powder that has not been fixed is preferably removed again prior to the surface treatment, but may also be removed during the surface treatment. The amount of powder fixed and/or the degree of fixation provide a heterogeneous mask.

the mask is at least printed on the surface and for this, use is made of at least two printheads, each intended to print an ink with a different chemical composition, in order to print a heterogeneous mask. These printheads may possibly employ the aforementioned grayscale system. By means of the grayscale system, the applied thickness of the ink can be varied easily.

In ideal circumstances, it is desirable that the non-shielded portions and the shielded portions are well separated from each other and there is therefore no mask on top of the non-shielded portions. However, during application of the mask it is possible that small amounts of the mask will also cover said non-shielded portions to a slight extent and/or it may be easier to apply continuously, wherein then almost the entire surface is covered by the mask. However, the thickness of the mask at the level of these non-shielded portions will be small, preferably less than 0.1 mm, even more preferably less than 0.01 mm, and most preferably less than 10 or 1 microns. We may also mention a base layer, which may or may not be present on the entire surface of the non-shielded portions. However, for simplicity we talk of non-shielded portions, since we can ensure that this base layer will have little influence. The base layer may be manufactured in such a way that after the start of the surface treatment, this base layer disappears quickly, for example immediately, for example in less than 1 second, preferably in less than 0.1 second, so that portions that have only been covered with the base layer will undergo almost the complete surface treatment and we may thus speak of non-shielded portions that are exposed to the complete surface treatment. Thus, if the mask is obtained by means of curing, it is possible not to carry out curing of the base layer. If at least two chemical materials are used for applying the mask, wherein these chemical materials have different resistance to the surface treatment, the base layer may be made from the material with the lowest resistance to the surface treatment. The base layer is in this case preferably always thinner than the edge portions and preferably always thinner than the internal portions. Another possibility is to remove this base layer before starting the surface treatment, by carrying out another treatment, for example a local polishing treatment or sandblasting treatment at the level of only the non-shielded portions.

By implementing one or more of the aforementioned features, a press element is obtained with the desired structure, wherein this structure does not comprise any undesirable sharp points, undesirable step-like transitions, undesirable transitions between different parts, etc., so that coated panels that are pressed by means of this press element also have the desired surface structure and may thus be very aesthetic. Thus, the press element may for example have relatively deep valleys, for example valleys more than 0.15 mm or more than 0.30 mm deep, and without sharp structures and/or the press element may comprise microstructures between for example 5 and 30 microns, wherein these microstructures are applied very precisely. In other words, by means of the aforementioned method, a press element can be obtained with a very high precision.

In a specific embodiment, said surface treatment comprises at least one etching treatment, wherein this etching treatment preferably comprises two or more sub-steps, in which in each case an etchant is brought into contact with said surface.

More preferably, etching parameters of the etching treatment, for example such as the etchant used, the temperature of the etchant, the flow rate of the etchant, etc., are identical in said two or more sub-steps, or at least differ for one etching parameter. Thus, the etchants used may be identical in said two or more sub-steps, or may differ at least for two. By means of two or more different etchants, it is possible to determine very accurately in which sub-steps certain portions of the mask, for example the edge portions, will degrade and/or how quickly the degradation proceeds and/or how gradually the degradation takes place. Etching away of material from the base element may therefore take place very accurately, so that the press element has the desired structure. Also, by means of the parameters such as time, temperature, flow rate, etc., etching away may be very precise. By working with sub-steps, etching away may be more precise and thus a press element is obtained with a very high precision.

Even more preferably, with two sub-steps, possibly following each other directly, called a first sub-step and a second sub-step hereinafter, the etching parameters are different at least for one parameter, wherein the edge portions break down at least partially during the first sub-step and the edge portions are completely broken down after the second sub-step, and wherein the internal portions still cover the same portion of the surface of the metallic base element after the second sub-step. In this case, the edge portions are for example broken down gradually, for example from the adjoining non-shielded portions to the adjoining internal portions, so that the press plate acquires the desired structure.

Even more preferably, the mask breaks down partially during one or more of said sub-steps. More preferably, the edge portions break down completely during one or more of said sub-steps, gradually from the respective non-shielded portions to the respective internal portions.

Even more preferably, at least the edge portions break down almost completely during one or more of said sub-steps. During the etching treatment, the surface is exposed at the level of the edge portions and so is also etched, but less than the non-shielded portions.

In a preferred embodiment, the mask is heterogeneous due to one or more of the following points of difference from the list comprising: thickness, chemical composition, degree of cure, strength of bond with the surface.

In a specific embodiment, the mask is printed on the surface, preferably digitally printed. By means of printing, and particularly by means of digital printing, the required mask can be applied very specifically and accurately. Using printing, it is also possible to obtain the correct position of the mask. It is also possible to print different thicknesses, for example by using a grayscale system and/or printing several layers on top of each other. The chemical composition during printing can also be selected. Thus, we can, for example, print with at least two types of ink/material with a different chemical composition, for example to obtain a mask with the aforementioned edge portions with a first chemical composition and the aforementioned internal portions with a second chemical composition.

More preferably, the mask is printed on the surface with different thicknesses. This is for example possible by printing only one layer at certain places and printing for example two or more layers on top of each other in several places and/or by altering the printing flow rate, i.e., the amount of ink per time point, and/or by allowing the printhead and/or the metallic base element to move more quickly or more slowly during application of the mask and/or by using a grayscale system.

In a specific embodiment, the mask comprises at least one curable substance, wherein the mask, after application thereof on the surface, is cured and wherein the curing is uneven or takes place unevenly, so that the mask comprises portions with a higher degree of cure and portions with a lower degree of cure. Portions with a higher degree of cure may be more resistant to the etching treatment than the portions with a lower degree of cure. The degree of cure of portions of the mask will thus determine how resistant these portions are to the etching treatment. It is therefore possible to determine which portions will break down during the etching treatment as well as when during the etching treatment, so that the press element obtained has the desired structure and the desired structure can be applied very accurately by means of etching. Curing may for example take place by means of heat/UV radiation/visible light/laser. A different degree of cure may for example be obtained by exposing certain places for a longer or shorter time to a curing source and/or by providing materials that will cure more quickly or less quickly.

More preferably, the curing of the mask takes place by means of a curing source, wherein for example this curing source comprises a digitally controlled curing beam and/or the curing source is controlled in register with the applied mask. Curing may then take place in register. Thus, the mask may comprise marks, and curing takes place on the basis of these marks. It is also possible that the applied mask is first scanned and the curing takes place on this basis and thus for example the edges of the mask, for example said edge portions, are cured less than said internal portions.

In a specific embodiment, the mask is made by spreading at least powder on the surface, and then melting and fixing this powder at the desired places on the surface by means of a laser source. This powder may be applied on the surface in such a way that the thickness is homogeneous, or so that the thickness is heterogeneous and thus at certain places, where a thicker mask is required, there is more powder per area. By means of the laser source, the powder may be attached to the surface, possibly with a varying strength of adhesion. Owing to the difference in strength of adhesion and/or the difference in thickness due to the amount of powder per area, the mask is heterogeneous. At the places where the powder has not attached to the surface, the powder can be removed again.

The method according to the first aspect of the invention may also form a component of the method according to the fourth aspect of the invention. This fourth aspect of the invention is discussed below.

According to a second aspect, the present invention also relates to a press element for manufacturing coated panels, more particularly a laminated panel, wherein this press element comprises a metallic base element with a surface structure obtained by a surface treatment, wherein this surface treatment preferably comprises at least one etching treatment, wherein this etching treatment preferably comprises two or more sub-steps, in which in each case an etchant is brought into contact with the metallic base element, wherein this surface structure at least comprises one or more base portions that together form a base and one or more structural portions which form bulges relative to the base, wherein the base portions preferably have a sloping transition into the structural portions.

This press element is preferably obtained by a method according to the first aspect of the invention, as described above. All advantages and preferred embodiments of the method described above are thus applicable to this press element. This press element may in this case have a very high precision, so that very aesthetic coated panels can be made by means of this press element.

More preferably, the structural portions comprise one or more foot portions and one or more central portions, wherein the one or more central portions are each completely surrounded by one or more adjoining foot portions, and the one or more foot portions extend between one or more adjoining base portions, and one or more adjoining central portions, wherein the central portions are located at a maximum distance from the base, viewed in a direction perpendicular to the base or perpendicular to a tangent to the base, and wherein the maximum distance of the foot portions from the base gradually increases from the adjoining base portion to the adjoining central portion, preferably at a constant rate of increase. The increase is in this case continuous and so is not stepwise and/or with sharp corners. This is very interesting for obtaining coated panels with deep structural portions, with a maximum depth of more than 0.1 mm, preferably more than 0.3 mm and even more preferably deeper than 0.5 mm. This is also very interesting for microstructures, since these microstructures may then have a very high precision, so that a coated panel obtained with said press element has the desired degrees of gloss and transitions between degrees of gloss.

The maximum distance between the top of an aforementioned central portion and the base portion may be for example at least 0.1 mm, preferably at least 0.3 mm and most preferably at least 0.5 mm and/or the maximum distance between the top of an aforementioned central portion and the base portion may be for example at most 30 microns, preferably at most 15 microns.

Preferably, the transition between the foot portions and the base portions has the form of a rounded obtuse angle.

Also preferably, the foot portions form part of the flanks of the structural portions or contribute to formation of the flanks of the structural portions, wherein these flanks are free from sharp points and preferably each extend substantially according to a constant slope angle with the base.

According to a third aspect, the present invention also relates to a coated panel, more particularly laminated panels, wherein the upper surface of the coated panel comprises a surface structure with one or more base portions which each extend in an almost identical base plane and one or more recesses, wherein these one or more recesses preferably have a sloping transition into the one or more base portions.

A coated panel of this kind is preferably obtained by means of a pressing step carried out with a press element according to the second aspect of the invention, as presented above, wherein even more preferably this press element is obtained by a method according to the first aspect of the invention, as described above. The advantages and embodiments described for the method and the press element are thus applicable to this coated panel.

Preferably, in this coated panel, the recesses comprise one or more edge portions and one or more internal portions, wherein the one or more internal portions are each completely surrounded by one or more adjoining edge portions, and the one or more edge portions extend between one or more adjoining base portions, and one or more adjoining internal portions, wherein the internal portions are located at a distance from the base, viewed in a direction perpendicular to the base, and wherein the distance from the edge portions to the base gradually increases from the adjoining base portion to the adjoining internal portion. This relates to a coated panel with a very aesthetic appearance. When the coated panel is obtained by means of a pressing step carried out with a press element as presented above, the position of the edge portions and the internal portions of the coated panel then corresponds to the position of the edge portions and the internal portions of the mask applied on the press element.

The maximum distance between the bottom of an aforementioned internal portion and the base portion may for example be at least 0.1 mm, preferably at least 0.3 mm and most preferably at least 0.5 mm and/or the minimum distance between the bottom of an aforementioned internal portion and the base portion may for example be at most 30 microns, preferably at most 15 microns.

More preferably, the transition between edge portions and the base portions has the form of a rounded obtuse angle.

The subject matter disclosed herein relates generally to structured press elements, their method of manufacture, and their use in the production of laminated panels.

More particularly, the invention relates to the manufacture of press elements which are employed in a method for manufacturing coated or laminated panels, wherein the coated panels are of the type which comprises a substrate and a provided thereon decorative top layer. Herein, this may relate, for example, to floor panels which substantially consist of a substrate, for example, an MDF or HDF (Medium or High-Density Fiberboard) panel and a provided thereon top layer, such as a laminate top layer. In particular, the invention relates to press elements which are applied in a method for manufacturing coated panels with a printed decor with a transparent or translucent synthetic material layer extending there above. It is known that such decor, whether or not by the intermediary of primer layers, can be printed directly on the substrate. However, the decor may also be provided on a material sheet, such as a paper sheet or a plastic foil, which is incorporated in said top layer. The transparent or translucent synthetic material layer forms a protective layer above the printed decor and may comprise, for example, wear-resistant particles, such as aluminum oxide. It is not excluded that this protective layer also comprises a material sheet, such as a paper sheet or plastic foil. This may relate, for example, to the manufacture of laminate floor panels, for example, according to a DPL (Direct Pressure Laminate) or HPL (High Pressure Laminate) technique. In the case of a DPL technique, one or more material sheets, provided with resin, are brought together with a substrate in a press device, where they, by means of a press element and under the influence of increased pressure and temperature, are connected to each other as well as to the substrate. In the case of an HPL technique, the top layer is formed separately, on the basis of two of more material sheets provided with resin, before the thus obtained top layer is provided on the substrate, for example, by gluing it onto the substrate. According to another possibility, this may relate to the manufacture of synthetic material-based floor panels or floor coverings, such as, for example, vinyl panels, vinyl coverings and the like. It is known, for example, from WO 01/96689 or WO 2014/115086, that at the surface or the decor side of such coated panels a relief of embossed portions can be formed, by which, for example, the natural structure of the motif represented in said decor can be imitated. So, for example, in the case that the decor represents a wood motif, a relief can be used which imitates a wood structure. Such wood structure may possibly be in correspondence with the underlying decor, with which then so-called embossments in register with the printed decor are obtained.

For realizing a relief at the decor side, structured press elements are applied, such as known. For manufacturing such press elements, various techniques are known, for example, from WO 2006/066776, EP 2 123 476, EP 2 251 193, EP 1 987 395 and EP 2 834 076. From EP'395, a method is known for manufacturing structured press elements, wherein the method comprises at least the following steps:

the step of providing an element of metal;
the step of providing a mask on a surface of the element for shielding portions of said surface;
the step of chemically treating non-shielded portions of said surface of the element; and
the step of removing said mask.

When aiming for a deep structure, several cycles of mask provision and etching may be employed. Such method however leads to protrusions have lateral edges with disturbingly visible boundaries, such as step shaped abrupt changes in inclination. These boundaries are copied into the surface of the coated or laminated panels manufactured therewith and distract from the generally fine imitation of a natural structure, such as for example a wood structure, or a structure forming lowered edges, such as beveled edges.

The present invention in the first place aims at an alternative method for manufacturing press elements. According to preferred embodiments solutions are offered to the problems with the floor coverings of the prior art. In particular certain embodiments provide a more natural structure, for example in which marks from a machining technique are less or no longer disturbingly visible in the finally obtained laminated panels.

The present invention, according to a fourth aspect, is defined in the following paragraphs. These paragraphs comprise reference signs to the FIGS. 9 and 10 which are described further below.

1.—Method for manufacturing structured press elements, characterized in that said method comprises at least the following step:

the step (S1) of providing a steel, copper or brass base element (10);
the step (S2) of structuring a major surface of said base element (10) by means of a first machining technique (M1), wherein said technique provides a structure of recesses (20) and/or protrusions (30) in or on said major surface, said protrusion (20) or recess (30) having a lateral edge (40);
the step (S3) of treating said lateral edge (40) with at least a second machining (M2) technique different from said first machining technique (M1).

With the aid of this method, it can be avoided that the structured press element has unwanted sharp points, unwanted step shaped transitions, or any unwanted transitions between different parts of its surface. This means that panels that are pressed with the aid of this press element can also have the desired surface structure and can thus be very aesthetic.

The first machining technique could or could not be a surface treatment as disclosed in the first aspect of this invention.

2.—Method according to paragraph 1, characterized in that said first machining technique (M1) comprises a chemical etching technique (e.g., as in FIG. 9).

This chemical etching technique could or could not be a surface treatment as disclosed in the first aspect of this invention.

3.—Method according to paragraph 2, characterized in that said chemical etching technique comprises at least one, though preferably a plurality, of etching cycles (S2.1-S2.2), wherein each etch cycle at least comprises applying an etch mask (60) to said base element (10), bringing the base element (10) into contact with an etching fluid, potentially rinsing the etched surface, removing said mask (60).

4.—Method according to paragraph 3, characterized in that said mask (60) is applied by means of a digital printing technique.

Printing of this mask can be done as described in the first aspect of this invention. This means the mask can be printed very accurately and/or with the desired thickness or thickness differences and/or with the desired ink.

5.—Method according to paragraph 3 or 4, wherein in at least two of said etching cycles, said mask (60) cover a mutually different area of said base element (10). The use of a plurality of etching cycles (S2.1-S2.2) with different masks (60) may lead to recesses (20) having lateral edges (40) showing a boundary (70) between portions that have been etched in both cycles or in only one of said cycles. Said boundary (70) may be step-shaped or about step-shaped or otherwise show a discontinuously changing inclination or abrupt change. When the etching technique is a surface treatment according to the first aspect of the invention, said boundary (70) can have very limited step-shaped changes or abrupt changes, such that the second machining technique (M2) can be very limited. The second machining technique (M2) preferably at least smoothens out or removes said boundary (70) and/or creates a continuously changing inclination on said lateral edge (40).

6.—Method according to any of the preceding paragraphs, characterized in that said first machining technique (M1) comprises an additive manufacturing technique (for example as in FIG. 10). Preferably said additive manufacturing technique adds material to said base element in a layerwise manner, wherein at least two layers (80) having a different surface area are applied on top of each other. The use of a plurality of added material layers (80) with different surface area may lead to protrusions (30) having lateral edges (40) showing a boundary (70) between the added layers. Said boundary (70) may be step-shaped or about step-shaped or otherwise show a discontinuously changing inclination or abrupt change. The second machining technique (M2) preferably at least smoothens out or removes said boundary (70) and/or creates a continuously changing inclination on said lateral edge (40).

7.—Method according to paragraph 6, characterized in that said first machining technique (M1) comprises laser cladding, selective metal sintering or selective laser melting of metal and/or ceramic powders, wherein said first machining technique is preferably using a laser, preferably said first machining technique comprises so-called liquid phase sintering. Liquid phase sintering allows for faster speeds while structuring as compared to solid phase sintering, which is not excluded here either. A very fast initial binding may be obtained through liquid phase sintering, while a post curing operation, e.g., in an oven may be necessary.

8.—Method according to paragraph 7, characterized in that said metal powder comprises at least two metals, wherein one of said metals has a melting point which is at least 80° C., or at least 250° C., higher than the other metal, e.g., respectively copper and aluminum, iron and copper, or iron and tin. Such powder blends allow for liquid phase structuring, wherein the lower melting point metal forms a binder for the higher melting point metal. Post curing operations, for example in an oven at a temperature below the melting point of the low melting metal, following the liquid or solid phase sintering may be needed to obtain a fully sintered result.

9.—Method according to paragraph 7, characterized in that said powder comprises metal powder and ceramic powder, e.g., respectively cobalt and tungsten carbide. Liquid phase sintering is obtainable here as well, wherein the metal powder, e.g., cobalt serves as a binder for the ceramic powder, e.g., tungsten carbide.

10.—Method according to paragraph 7, characterized in that said powder comprises metal powder and polymeric powder, e.g., respectively aluminum and polyamide. Liquid phase sintering is obtainable here as well, wherein the polymeric powder, e.g., polyamide powder, serves as a binder for the metal, e.g., aluminum powder.

11.—Method according to paragraph 7, wherein said powder comprises powder of a metal alloy with an eutectic phase, such as lead-tin, cast-iron or a eutectic mixture of iron and carbon, copper-silver eutectic mixture. Liquid phase sintering is obtainable here as well, since at the eutectic temperature solid and liquid phase can coexist.

12.—Method according to any of the preceding paragraphs, characterized in that said first machining technique comprises a mechanical milling technique. Preferably said mechanical milling technique removes material in several passes of a rotating milling tool over said base element, wherein in each pass a layer of material is removed, wherein at least two layers having a different surface area are removed, vertically see, on the same area of said base element. The use of a plurality of removed material layers with different surface area may lead to protrusions having lateral edges showing a boundary (70) between the removed layers. Said boundary (70) may be step-shaped or about step-shaped or otherwise show a discontinuously changing inclination or abrupt change. The second machining technique preferably at least smoothens out or removes said boundary (70) and/or creates a continuously changing inclination on said lateral edge.

13.—Method according to any of the preceding paragraphs, characterized in that said base element (10) is a flat sheet shaped element, for example a sheet metal of 2.5 to 7 mm thick.

14.—Method according to any of paragraphs 1 to 11, characterized in that said base element (10) is a cylindrical element, for example a cylinder having a copper or brass circumference. Preferably said cylinder has a diameter of more than 300 mm.

15.—Method according to any of the preceding paragraphs, characterized in that said first machining technique (M1) is active on a larger area of said base element (10) than said second machining technique (M2).

16.—Method according to any of the preceding paragraphs, characterized in that said second machining technique (M2) is substantially exclusively or exclusively active on said lateral edges (40), or 50% of the area machined by said second machining technique (M2) is located on lateral edges (40) created at least in part by said first machining technique (M1).

17.—Method according to any of the preceding paragraphs, characterized in that said second machining technique (M2) comprises laser machining and/or electrical discharge machining.

18.—Method according to any of the preceding paragraphs, characterized in that said second machining technique (M2) comprises laser ablation and/or laser milling.

19.—Method according to any of the preceding paragraphs, characterized in that said second machining technique (M2) comprises melting at least a portion of the material available on said lateral edge (40), e.g., for the creation of a smoothened lateral edge (40), i.e., without abrupt changes in inclination or with a minimized boundary (70) or minimized abrupt change created by said first machining technique (M1).

20.—Method according to any of the preceding paragraphs, characterized in that said second machining technique (M2) comprises removing material from said lateral edge (40), e.g., for the creation of a smoothened lateral edge (40), i.e., without abrupt changes in inclination or with a minimized boundary (70) or minimized abrupt change created by said first machining technique (M1).

21.—Method according to any of the preceding paragraphs, characterized in that said method further comprises the step of applying a metal-based and/or ceramic based coating on the structured surface of said press element. For example, a chrome coating or chrome plating may be applied.

22.—Method for manufacturing laminated panels, wherein a press element in accordance with any of the preceding paragraphs is applied for creating a structure in a decorative surface of said laminated panel. Preferably said structure is in accordance, e.g., in register, with a printed decor available at said decorative surface. Preferably such embossments in registration are as further described in WO 01/96689 and/or WO 2006/066776, with this understanding that said laminated panels do not need to comprise a wood-based core and/or a paper-based or melamine-based surface. Neither do they necessarily need to be used in a single daylight press. The press elements of the present invention may also be used to structure such laminated panels as PVC based panels or other plastic based panels. For example, the press elements of the present invention may be used as an embossing roller in an extrusion line for manufacturing so-called SPC (stone plastic composite) floor panels.

BRIEF DESCRIPTION OF THE DRAWINGS

For better illustrating the features of the invention, some preferred embodiments are described hereunder, as examples without any limiting character, referring to the appended drawings, in which.

Figure 9:
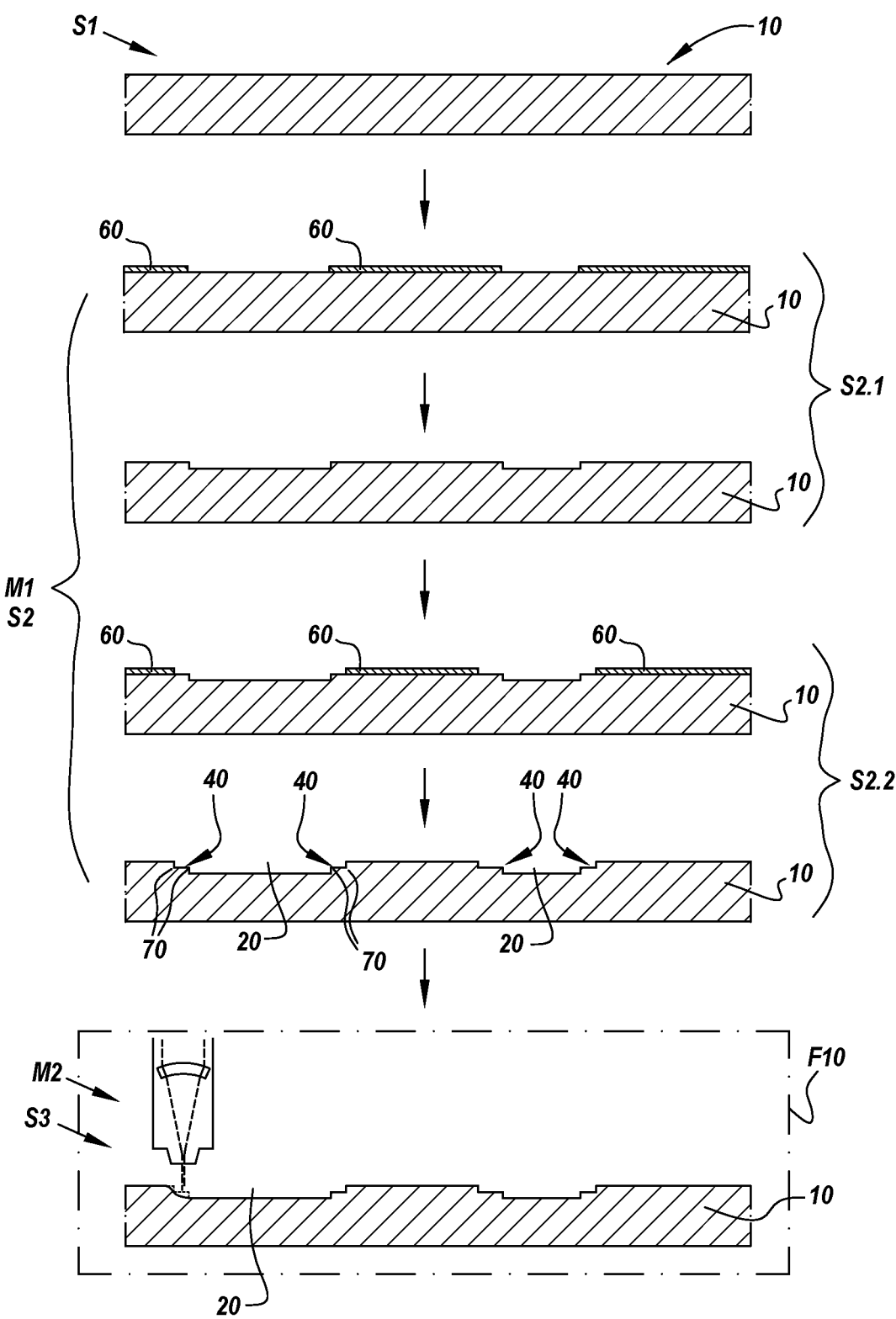
FIG. 9 shows schematically some steps in a method according to the fourth aspect of the invention.
Figure 10:
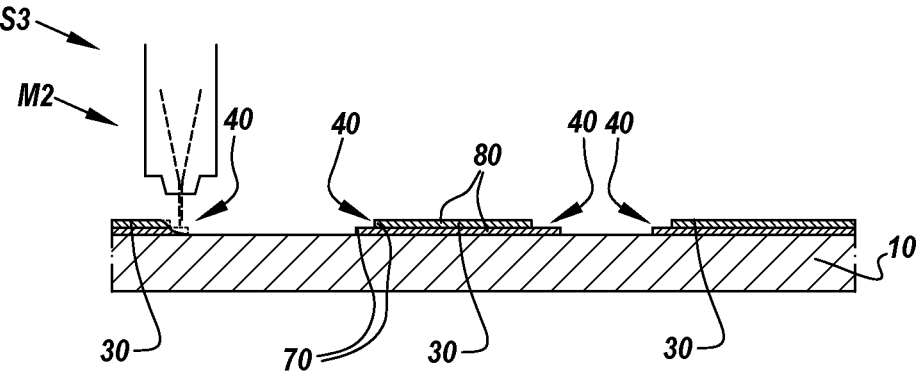
FIG. 10 shows a variant in a view on the area indicated with F10 in FIG. 9.

The reference numbers used in the FIGS. 9 and 10 are defined by means of the paragraphs above.

DETAILED DESCRIPTION OF THE INVENTION

The present invention according to the fourth aspect is in no way limited to the above-described embodiments, but such methods may be realized according to several variants without leaving the scope of the invention.

The press plate 1 that is described here is intended to form coated panels 4 with deep structures 7, being notches 7 with a maximum depth of more than 0.15 mm, preferably more than 0.3 mm. The present invention is not, however, limited to this. Thus, the present invention also relates to press plates/coated panels with microstructures as well as to press plates/coated panels with microstructures and with high/deep structures. Here, the press plate 1 comprises a base portion that forms a base and one or more structural portions 8 that form bulges relative to the base, wherein the base portion has a sloping transition into the structural portions 8.

The structural portions 8 each comprise a foot portion 8*b* and a central portion 8*a*, wherein each central portion 8*a* is completely surrounded by the adjoining foot portion 8*b*, and each foot portion 8*b* extends between the base portion and the adjoining central portion 8*a*. The difference between the foot portions 8*b* and the central portions 8*a* is not visible in the press plate 1 obtained. This is represented by lines in FIG. 1. This is possible because the foot portions 8*b* extend at the level of the edge portions 3*b* of the mask 3 that decompose during the surface treatment (see hereunder) and the central portions 8*a* extend at the level of the internal portions 3*a* of the mask 3 (see hereunder) in such a way that the position of said foot portions 8*b* and the central portions 8*a* coincide with the positions of the edge portions 3*b* and the internal portions 3*a* of the mask 3.

Figures 1, 2, 3, 4:
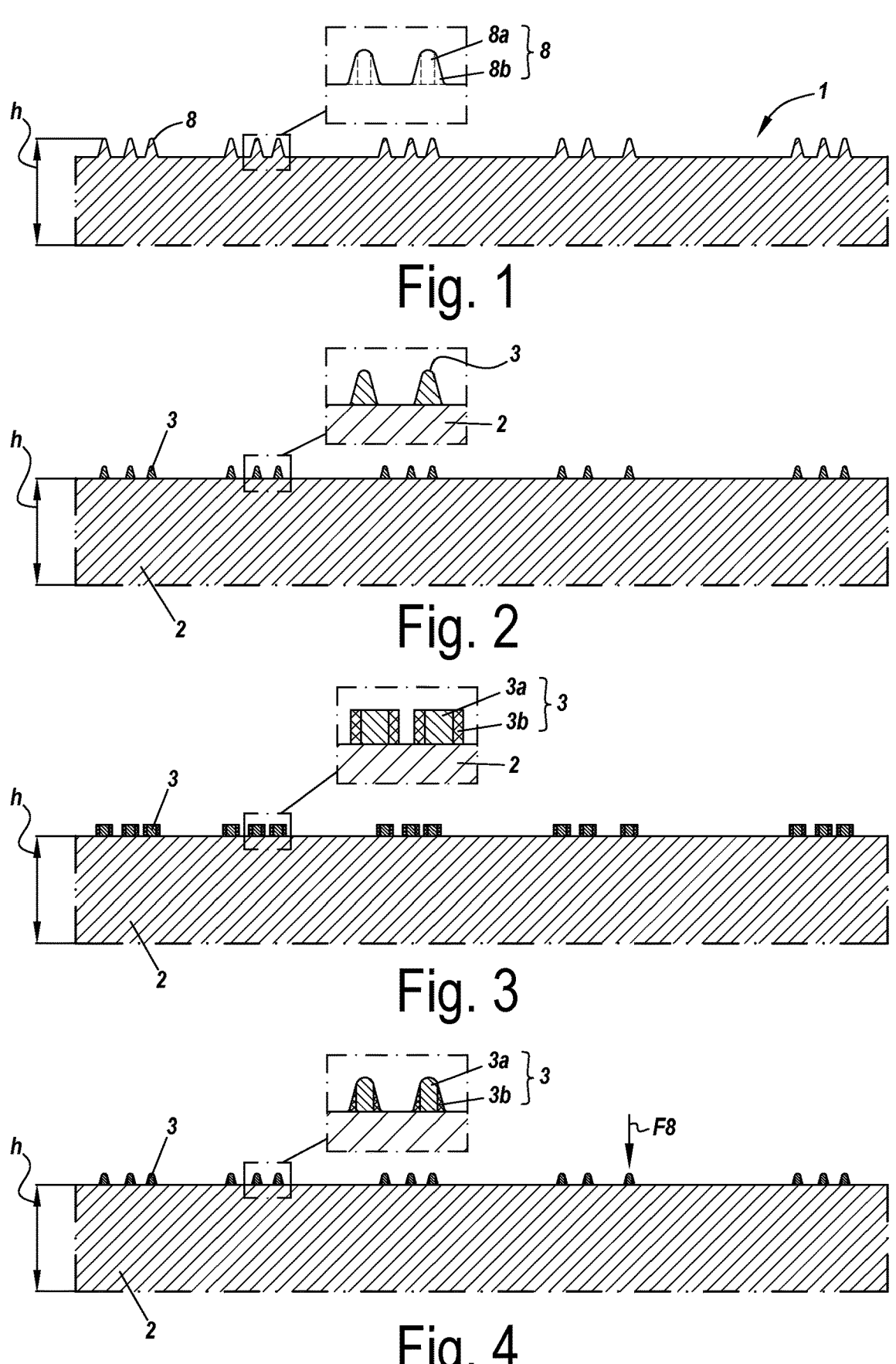
FIG. 1 is a schematic representation of a cross section of a press plate according to the second aspect of the invention.
FIG. 2 is a schematic representation of a cross section of a metallic base element on which a mask is applied for manufacturing the press plate shown in FIG. 1, according to a first embodiment of a method according to the first aspect of the invention.
FIG. 3 is a schematic representation of a cross section of a metallic base element on which a mask is applied for manufacturing the press plate shown in FIG. 1, according to a second embodiment of a method according to the first aspect of the invention.
FIG. 4 is a schematic representation of a cross section of a metallic base element on which a mask is applied for manufacturing the press plate shown in FIG. 1, according to a third embodiment of a method according to the first aspect of the invention.

The press plate 1 shown schematically in FIG. 1 has a maximum height h and can be obtained in various ways. Referring to FIGS. 2 to 5, four possible methods are discussed below, all relating to methods according to the invention.

These methods all have the following features in common:

it always relates to a method for manufacturing a structured press element 1, wherein these methods comprise at least the following steps:

providing a metallic base element 2 with a height h, being a plate comprising a surface to be structured, wherein the plate is for example made of steel with optionally a copper coating at the level of the surface to be structured. The metallic base elements 2 shown here are plate-shaped, but cylindrical metallic base elements are for example also possible for obtaining structured embossing rollers (not shown here).

applying a mask 3 on a surface of the metallic base element 2, wherein the mask 3 has a certain resistance to a surface treatment so as to cover the surface from the surface treatment at the level of the mask 3;

carrying out the surface treatment;

removing the mask 3;

wherein said mask 3 has a heterogeneous build, and at least this build determines the extent of said resistance to the surface treatment.

In these methods, the surface treatment comprises at least one etching treatment. This etching treatment comprises two or more sub-steps, wherein in each sub-step said surface is brought into contact with an etchant, for example by introducing the metallic base element 2 with the mask 3 applied thereon into an etch bath comprising an etchant, so that the surface and the mask 3 come into contact with the etchant. Thus, for example in each sub-step the metallic base element 2 can be immersed in the etchant, for a number of minutes, for example 1, 2, 3, 4, 5, 6 or more minutes. The etchant may also be sprayed on the metallic base element 2.

As can be seen in FIGS. 2 to 4, the mask 3 divides said surface of the metallic base element 2 into one or more shielded portions, on which the mask 3 is located, and one or more non-shielded portions, on which there is no mask 3, and the mask 3 comprises several edge portions 3*b* and several internal portions 3*a*, wherein the internal portions 3*a* are each completely surrounded by adjoining edge portions 3*b*, and the edge portions 3*b* extend between one or more adjoining non-shielded portions of the surface, and one or more adjoining internal portions 3*a* of the mask 3.

Figure 5:
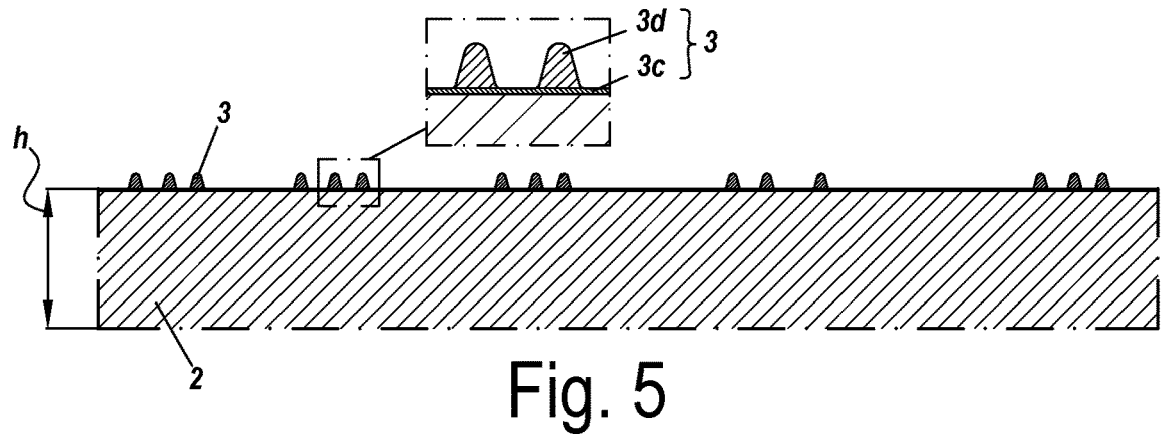
FIG. 5 is a schematic representation of a cross section of a metallic base element on which a mask is applied for manufacturing the press plate shown in FIG. 1, according to a fourth embodiment of a method according to the first aspect of the invention.
Figure 6:
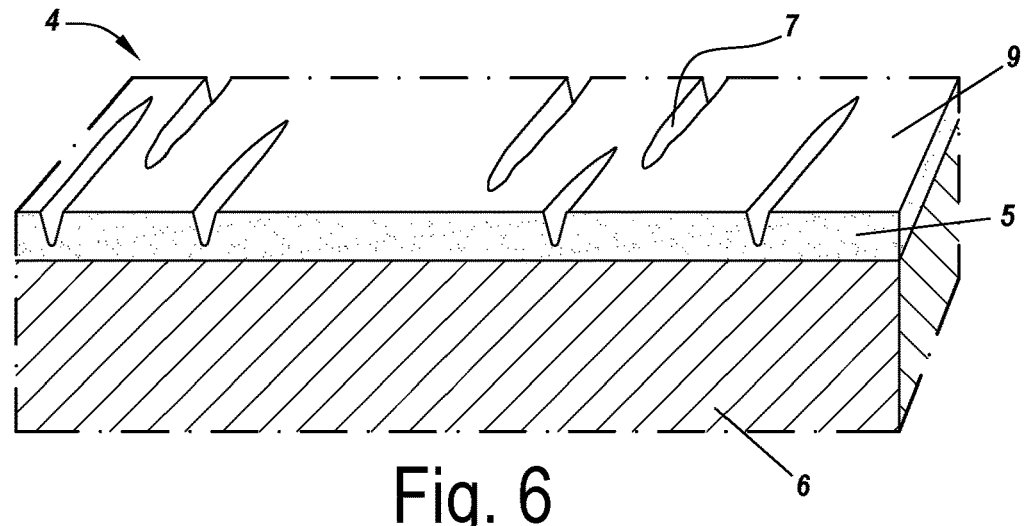
FIG. 6 is a schematic perspective view of a portion of a coated panel according to the third aspect of the invention, obtained with a press plate as shown in FIG. 1.
Figure 7:
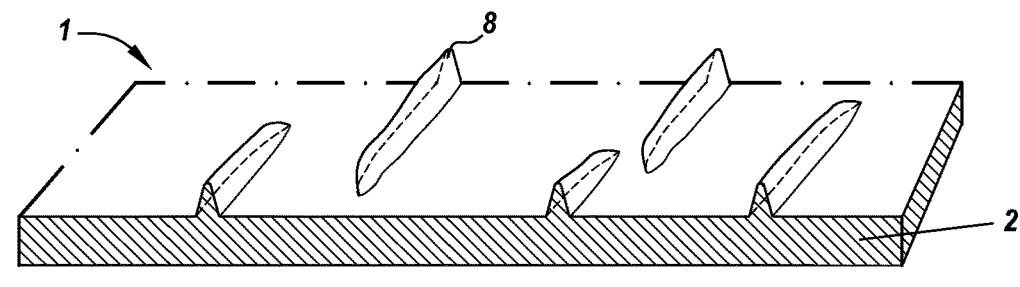
FIG. 7 is a schematic representation of a perspective view of a portion of a press plate according to the invention.
Figure 8:
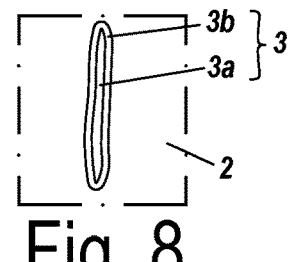
FIG. 8 is a schematic representation of a top view of a metallic base element on which a mask is applied for manufacturing the press plate shown in FIG. 1, according to the third embodiment of a method according to the first aspect of the invention.

It can be seen in FIG. 5 that the entire surface is covered with the mask 3, wherein certain portions are only covered with a thin base layer 3*c*. In view of the small thickness of this base layer 3*c* and since this base layer 3*c* will quickly disappear during the surface treatment, for simplicity the portions of the surface that are only covered by the base layer 3c are also indicated here as non-shielded portions as described above. Therefore, said non-shielded portions and shielded portions are also applicable in this case. The mask 3 further comprises bulges 3d relative to the base layer 3c, wherein these bulges 3d also comprise said edge portions 3b and internal portions 3a (not shown in the figure), wherein the edge portions 3b extend between the adjoining base layer 3c and respective adjoining internal portions 3a. FIGS. 2 to 5 are thus discussed together hereunder.

The masks 3 shown in FIGS. 2 to 5 all have a heterogeneous build, so that the resistance of the mask 3 is not identical everywhere and the etching treatment at certain places will or will not be able to remove material from the metallic base element 2. At the places where the etching treatment is able to remove material, this may take place during the complete etching treatment and/or only starting from a certain sub-step and/or after a certain time.

As shown in FIG. 2, the mask 3 is built up from one material, for example a wax or a varnish or one ink, wherein the thickness of the mask 3 is heterogeneous. The build of the mask 3 is such that on said edge portions 3b, the thickness of the mask 3 increases from the respective adjoining non-shielded portions to the adjoining internal portions 3a, wherein this increase is gradual. Owing to this build, the resistance of the edge portions 3b of the mask 3 increases from respective adjoining non-shielded portions to respective adjoining internal portions 3a, and in this case gradually. The result is that during the etching treatment, the edge portions 3b will degrade from the non-shielded portions toward the internal portions 3a, so that a press element 1 with sloping transitions between the base portions and the structural portions 8 is obtained, with structural portions 8 comprising said foot portions 8b and central portions 8a. Since this is only a question of a thickness difference, and the material is always the same, the edge portions 3b and the internal portions 3a are not shown here as separate components of the mask 3, since the edge portions 3b and the internal portions 3a are also not visible in practice as separate components of the mask 3. In practice, only sloping bulges are visible.

In FIG. 3, the mask 3 always has roughly the same thickness, but the mask 3 is built up from two materials, namely a first material and a second material, wherein the resistance of the first material to the etching treatment is greater than the resistance of the second material to the etching treatment. The edge portions 3b are built up from the second material and the internal portions 3a are built up from the first material. The result is that during the etching treatment, the edge portions 3b will degrade from the non-shielded portions toward the internal portions 3a, so that a press element 1 with sloping transitions between the base portions and the structural portions 8 is obtained, with structural portions 8 comprising said foot portions 8b and central portions 8a. Thus, it is possible that during a sub-step of the etching treatment, use is made of an etchant, wherein the second material is not resistant to this etchant and the first material is resistant or is more resistant than the second material. The result is that during this sub-step at least the second material and thus at least the edge portions 3b degrade. It is then possible to work with an additional sub-step, wherein the surface at the level of the edge portions 3b, which have disappeared, is processed. Optionally the surface treatment may comprise yet other additional treatments such as sandblasting, for example to reduce the edge thickness of the mask 3 gradually at the level of the edge portions 3b toward the non-shielded portions, prior to the etching treatment. This additionally ensures that the edge portions 3b will gradually decrease, from the non-shielded portions toward the internal portions 3a, so that the transitions between the foot portions 8b and central portions 8a of the press element 1 obtained are very sloping.

In FIG. 4, the thickness of the mask 3 is heterogeneous. The build of the mask 3 is such that on said edge portions 3b, the thickness of the mask 3 increases from the respective adjoining non-shielded portions to the adjoining internal portions 3a, wherein this increase is gradual. Moreover, the mask 3 is built up from two materials, namely a first material and a second material, wherein the resistance of the first material to the etching treatment is greater than the resistance of the second material. The edge portions 3b are built up from the second material and the internal portions 3a are built up from the first material. The result is that during the etching treatment, the edge portions 3b will gradually degrade from the non-shielded portions toward the internal portions 3a, so that a press element 1 with sloping transitions between the base portions and the structural portions 8 is obtained, with structural portions 8 comprising said foot portions 8b and central portions 8a.

As shown in FIG. 5, the mask 3 is built up from one material, for example a wax or a varnish or one ink, wherein the thickness of the mask 3 is heterogeneous. The build of the mask 3 is such that on said edge portions 3b, the thickness of the mask 3 increases from the respective adjoining non-shielded portions to the adjoining internal portions 3a, wherein this increase is gradual. Moreover, the mask 3 always comprises a base layer 3c, which covers the whole area of the surface, in such a way that the edge portions 3b always have a transition into the base layer 3c. Owing to this build, the resistance of the edge portions 3b of the mask 3 increases from respective adjoining non-shielded portions to respective adjoining internal portions 3a, and gradually in this case. The result is that during the etching treatment, the base layer 3c degrades almost immediately and the edge portions 3b will degrade from the non-shielded portions toward the internal portions 3a, so that a press element 1 with sloping transitions between the base portions and the structural portions 8 is obtained, with structural portions 8 comprising said foot portions 8b and central portions 8a. Another option is that prior to the etching treatment, another type of surface treatment is carried out, such as sandblasting, polishing, a laser treatment—such as laser ablation—wherein the base layer 3c is removed from the mask 3. Removal of the base layer 3c may for example take place in register.

By means of the press element 1 as obtained by the aforementioned methods, a laminated panel 4 may be pressed. This laminated panel 4 comprises for example a hard core/substrate 6 made of for example MDF, HDF, particle board, a mineral-based board, a thermoplastic-based board, wherein a top layer 5 comprising one or more sublayers is applied on top of this hard core/substrate 6, wherein these sublayers may comprise resin-impregnated papers, thermoplastic layers, etc. Here, the press plate 1 is able to transfer its relief onto the top layer 5. The result is a top layer 5 comprising a base plane 9 and sloping recesses 7 relative to this base plane 9.

The invention claimed is:

1. A method for manufacturing a structured press element, wherein the method comprises at least the following steps:
   providing a metallic base element;
   applying a mask on a surface of the metallic base element, wherein the mask has a certain resistance to a surface treatment so as to cover the surface at least temporarily from the surface treatment at a level of the mask;

carrying out the surface treatment;

wherein said mask has a heterogeneous build, and at least the build determines an extent of said resistance to the surface treatment;

wherein the mask divides said surface of the metallic base element into one or more shielded portions, on which the mask is located, and one or more non-shielded portions, on which there is no mask, and wherein the mask comprises one or more edge portions and one or more internal portions, wherein the one or more internal portions are each completely surrounded vertically by one or more adjoining edge portions, and the one or more edge portions extend between one or more adjoining non-shielded portions of the surface, and one or more adjoining internal portions of the mask, wherein the build of the mask is at a level of at least the edge portion, the resistance to the surface treatment increases gradually, from a respective adjoining non-shielded portion to a respective adjoining internal portion;

wherein the method comprises one or more of the following features, provided these are not incompatible;

the mask is made from at least one curable substance, wherein a degree of cure at the level of an aforementioned edge portion is lower than the degree of cure at the level of a respective adjoining internal portion;

the aforementioned one or more portions all have an identical first chemical composition and the aforementioned one or more internal portions all have an identical second chemical composition, wherein the first chemical composition is less resistant to the surface treatment than the second chemical composition;

the mask is at least printed on the surface, use is made of at least two printheads, each being intended to print with an ink with a different composition, in order to print a heterogeneous mask, wherein the edge portions are printed with a first of said at least two printheads and the internal portions are printed with a second of said at least two printheads.

2. The method in accordance with claim 1, wherein the method comprises one or more of the following features, provided these are not incompatible:

the build of the mask is at the level of at least one aforementioned edge portion the mask is made from at least one curable substance, wherein a degree of cure at the level of an aforementioned edge portion is lower than the degree of cure at the level of a respective adjoining internal portion;

the aforementioned one or more edge portions all have an identical first chemical composition and the aforementioned one or more internal portions all have an identical second chemical composition, wherein the first chemical composition is less resistant to the surface treatment than the second chemical composition;

the mask is at least printed on the surface, use is made of at least two printheads, each being intended to print with an ink with a different composition, in order to print a heterogeneous mask, wherein the edge portions are printed with a first of said at least two printheads and the internal portions are printed with a second of said at least two printheads.

3. The method in accordance with claim 1, wherein the surface treatment comprises one or more treatments including: an etching treatment, a sandblasting treatment or a polishing treatment.

4. The method in accordance with claim 1, wherein said surface treatment comprises at least one etching treatment, and wherein the etching treatment comprises two or more sub-steps, in which in each case an etchant is brought into contact with said surface and wherein etching parameters, are identical in said two or more sub-steps, or at least differ for one etching parameter.

5. The method in accordance with claim 4, wherein in two sub-steps, following each other directly, called a first sub-step and a second sub-step hereinafter, the etching parameters are different at least for one parameter, wherein the edge portions break down at least partially during the first sub-step and the edge portions have completely broken down after the second sub-step, and wherein the internal portions still cover the surface of the metallic base element after the second sub-step.

6. The method in accordance with claim 4, wherein the mask breaks down partially during one or more of said sub-steps.

7. The method in accordance with claim 4, wherein at least the edge portions break down almost completely during one or more of said sub-steps.

8. The method in accordance with claim 1, wherein the build of the mask is heterogeneous on account of one or more points of difference from a list comprising: thickness, chemical composition, degree of cure, strength of bond with the surface.

9. The method in accordance with claim 1, wherein the mask is printed on the surface, is digitally printed, and wherein the mask is printed on the surface with different thicknesses.

10. The method in accordance with claim 1, wherein the mask comprises at least one curable substance, wherein the mask, after application thereof on the surface, is cured and wherein the curing is uneven, so that the mask comprises portions with a higher degree of cure and portions with a lower degree of cure.

11. The method in accordance with claim 10, wherein the curing of the mask takes place by a curing source, wherein the curing source is controlled digitally, comprises a digitally controlled curing beam, and/or the curing source is controlled in register with the applied mask.

12. A method for manufacturing a structured press element, wherein the method comprises at least the following steps:

providing a metallic base element;

applying a mask on a surface of the metallic base element, wherein the mask has a certain resistance to a surface treatment so as to cover the surface at least temporarily from the surface treatment at a level of the mask;

carrying out the surface treatment;

wherein said mask has a heterogeneous build, and at least the build determines an extent of said resistance to the surface treatment;

wherein the mask divides said surface of the metallic base element into one or more shielded portions, on which the mask is located, and one or more non-shielded portions, on which there is no mask, and wherein the mask comprises one or more edge portions and one or more internal portions, wherein the one or more internal portions are each completely surrounded vertically by one or more adjoining edge portions, and the one or more edge portions extend between one or more adjoining non-shielded portions of the surface, and one or more adjoining internal portions of the mask, wherein the build of the mask is at a level of at least the edge portion, the resistance to the surface treatment increases gradually, from a respective adjoining non-shielded portion to a respective adjoining internal portion;

wherein a chemical composition of the one or more edge portions differs from the chemical composition of the one or more internal portions.

* * * * *